US006228293B1

(12) United States Patent
Kriegsmann et al.

(10) Patent No.: US 6,228,293 B1
(45) Date of Patent: May 8, 2001

(54) PROCESS FOR PRODUCING A BODY HAVING A POROUS MATRIX FROM AT LEAST ONE RECRYSTALLIZED MATERIAL

(75) Inventors: Jochen Kriegsmann, Hoehr-Grenzhausen; Rolf Meistring, Glonn; Nicole Neumann, Ulm; Reinhard Nixdorf, Sieburg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/138,321

(22) Filed: Aug. 24, 1998

(30) Foreign Application Priority Data

Aug. 22, 1997 (DE) .............................. 197 36 560

(51) Int. Cl.$^7$ ................................. C04B 35/573
(52) U.S. Cl. .................. 264/29.7; 264/638; 264/640; 264/641; 264/645; 264/650; 264/651; 264/658; 264/682
(58) Field of Search ................. 264/682, 651, 264/645, 638, 29.7, 658, 640, 641, 650

(56) References Cited

U.S. PATENT DOCUMENTS

| 2,938,807 | * | 5/1960 | Anderson . | |
|---|---|---|---|---|
| 2,964,823 | | 12/1960 | Fredriksson . | |
| 4,154,787 | * | 5/1979 | Brown | 264/101 |
| 4,789,506 | * | 12/1988 | Kasprzyk | 264/60 |
| 4,863,657 | | 9/1989 | Tanaka et al. . | |
| 5,094,985 | | 3/1992 | Kijima et al. . | |
| 5,643,514 | * | 7/1997 | Chwastiak | 264/640 |

FOREIGN PATENT DOCUMENTS

| 28 37 900A1 | 8/1978 | (DE) . |
|---|---|---|
| 31 49 796A1 | 12/1981 | (DE) . |
| 31 49 796 | 6/1983 | (DE) . |
| WO 93/25495 | 12/1993 | (WO) . |

OTHER PUBLICATIONS

Rekristallisiertes Siliciumcarbid: Verfahrenstechnische Aspekte und Sinterverhalten, J. Kriegsmann and Hoehr–Grenzhausen 1990; pp. 481–484.

* cited by examiner

Primary Examiner—James Derrington
(74) Attorney, Agent, or Firm—Evenson, McKeown, Edwards & Lenahan, P.L.L.C.

(57) ABSTRACT

A process for producing a body having a porous matrix of at least one recrystallized ceramic material, or for producing a similar fiber-reinforced body, includes shaping a raw material batch which contains a raw material powder and then sintering. A raw material powder is used which has grain size distribution of a fine grain fraction of an average grain size of at most approximately 2 µm and a coarse grain fraction of an average grain size of approximately 1.5 µm to approximately 30 µm, and the sintering process is carried out at a temperature of at most approximately 1,800° C. Because of the selected grain sizes and grain size distributions, the sintering process can be carried out at lower temperatures. In particular, reinforcing fibers can be worked in which can withstand higher sintering temperatures. By defining the grain size of the powder, a porosity can also be set which permits a good impregnating with organic and/or inorganic substances.

15 Claims, 2 Drawing Sheets

PROCESS FOR PRODUCING A BODY HAVING A POROUS MATRIX FROM AT LEAST ONE RECRYSTALLIZED MATERIAL

BACKGROUND AND SUMMARY OF THE INVENTION

This application claims the priority of German Application No. 197 36 560.4, filed Aug. 22, 1997, the disclosure of which is expressly incorporated by reference herein.

The invention relates to a process for producing a body having a porous matrix from at least one recrystallized material, by shaping a raw material batch which contains a raw material powder and then sintering. The invention also relates to a body which can be produced by the process. The invention further relates to a process for producing a fiber-reinforced body having a porous matrix and to a body which can be produced according to the process.

Sintered silicon carbide (SSiC) is obtained from compact grained SiC particles with sintering additives for activation and carbon additives for dense sintering. Additives may be, for example, additions of boron and carbon or aluminum and carbon. A batch of raw material is shaped producing a green body, and the green body is sintered without pressure at approximately 2,000° C. A dense product with more than 96% theoretical density is obtained. However, densification during sintering results in shrinkage.

Recrystallized materials, such as recrystallized silicon carbide (RSiC) and recrystallized boron carbide ($RB_4C$) are generally known. Recrystallized aluminum nitride (RAlN), recrystallized titanium carbide (RTiC) and recrystallized boron nitride (RBN) are also known. They are generally obtained by sintering batches of raw material which contain raw material particles and optionally additional substances.

Recrystallized silicon carbide is the best known recrystallized material. In comparison to conventional SSiC, it advantageously does not shrink during sintering. Recrystallized silicon carbide is obtained by sintering silicon carbide particles, preferably with bimodal grain distributions. Processes of this type are known from U.S. Pat. No. 2,964,823, German Patent Document DE-OS 2 837 900 and German Patent Document DE 31 49 796. The average particle size of the coarse grain is on the order of about 100 µm. The size of the fine grain is approximately 1.5 to 8 µm. These particles are sintered to a porous body at temperatures of above 2,000° C. No sintering additives are required. The sintering mechanism is known. The presence of free carbon is harmful to the consolidation of the structure because it hinders or even prevents the sintering mechanism. No densification takes place during sintering and no shrinkage. A pure undensified porous silicon carbide is obtained.

Silicon carbide is a constituent of fiber-reinforced ceramics, which are preferably produced by the polymer route, by chemical vapor infiltration (CVI) or by liquid silicating. During liquid silicating of fiber-reinforced ceramics, a carbon matrix in contact with liquid silicon is converted to silicon carbide. The carbon matrix to be converted is normally produced by the pyrolysis of resins with a high carbon yield.

The production of fiber-reinforced ceramics by silicating C-matrices—mainly carbon-fiber-reinforced matrices—is known per se. Fibers are mixed with the resin, and optionally with additional substances, shaped and hardened. A resulting green compact is pyrolized. A porous fiber-reinforced silicated carbon body results.

Three problems are usually encountered in the process. First, an irregular pore distribution is usually observed, and very large pores or gaps are formed. During liquid silicating, silicon will fill the pores and remain. Remaining silicon can not be converted to silicon carbide.

Second, the resin which supplies carbon creates relatively massive irregular carbon matrix regions. During the reaction with liquid silicon, a silicon carbide layer forms on the surface around larger C-regions. The resulting approximately 5–10 µm thick boundary layer prevents further conversion of the carbon enclosed by it. Conversion is only possible by way of diffusion processes over the boundary layer. If it takes place at all, it takes place very slowly. The carbon is therefore not completely converted.

Third, the resulting pore structure is not continuously open, or pore ducts may be closed by the converting reaction. Regions therefore exist into which liquid silicon cannot penetrate. In this case, no conversion of the carbon matrix can take place.

In order to provide a remedy, it has been attempted to create a crack structure into which the liquid silicon can penetrate, by way of, for example, pyrolysis of the resin. Pyrolysis creates an artificial duct porosity or open-pore condition. However, conversion to silicon carbide takes place only in the ducts.

Other attempts have been made to influence pore structure by resin additions. Complete carbon matrix conversion has not been achieved in these cases either.

In the case of the known process, fiber-reinforced silicon carbide ceramics are therefore obtained in which there remains residual carbon content and residual silicon content. Such ceramics, however, are not suitable for high-temperature applications in an oxidizing atmosphere because the residual carbon decomposes in air starting at approximately 400° C. For applications above 1,400°, there must also not be any free silicon because silicon starts to melt at these temperatures.

It is therefore an object of the invention to provide a process and products of the above-mentioned type by means of which, in a simple and reasonably priced manner, bodies can be obtained which have a regular pore structure, particularly fiber-reinforced silicon carbon ceramics, in which the silicon as well as the carbon are completely converted to silicon carbide.

This and other objects and advantages are achieved by the process wherein a raw material powder is used during shaping and sintering which contains a fine grain fraction of an average grain size of at most approximately 2 µm, and a coarse grain fraction of an average size of approximately 1.5 µm to approximately 30 µm, and wherein the sintering process is carried out at a temperature of at most about 1800° C. The process permits the production of recrystallized ceramic materials having a defined, particularly fine and regular pore structure. As a result of a lowered sintering temperature, the process and product are more reasonably priced and suitable for industrial applications.

This object is also achieved by producing a raw material batch which contains a raw material powder having a grain size distribution with a fine grain fraction of an average grain size of at most about 2 µm and a coarse grain fraction of an average grain size of about 1.5 µm to approximately 30 µm, mixing reinforcing fibers with the raw material batch, shaping the raw material producing a green body, sintering the green body at a temperature of at most about 1,800° C. so that a fiber-reinforced body is formed having a porous matrix made of a recrystallized ceramic material, impregnating the fiber-reinforced body with a carbon-supplying substance and converting the carbon-containing substance to carbon so that a fiber-reinforced body is formed which has a carbon-containing porous matrix. This process permits adjusting of the structure and of the porosity of porous matrices such that a liquid infiltration medium, such as a silicon or carbon precursor, can homogeneously penetrate the whole body.

The object is also achieved with the products resulting from either of the above two processes.

The processes according to the invention are based on the recognition that problems, as they occurred in the previously mentioned processes, are the result of matrix shrinkage during pyrolyzing.

Although it is known that recrystallized materials, such as recrystallized silicon carbide, exhibit no shrinkage during sintering at lower temperatures, sintering temperatures had heretofore been much too high for using this material for production of fiber-reinforced ceramics. Conventional ceramic reinforcing fibers may be subjected to maximum temperatures of 1,600° C. Fibers still under development, such as SiBNC fibers, may possibly be able to be subjected to higher temperatures in an inert atmosphere, but will still have temperature maximums of 2,000° C. The high-temperature resistant C-fibers are also stable only under inert conditions.

It was found that, when particularly fine particles are used, the sintering temperature of recrystallized ceramic materials, such as silicon carbide, is considerably reduced, which was surprising and not to be expected. A certain grain size distribution is therefore required; the substance to be sintered must contain a fraction of particularly fine grains. This fine grain fraction sublimes at low temperatures and is deposited on energetically favorable regions, such as contact points of the coarser grains, resulting in consolidation without shrinkage.

The sintering temperature can therefore be controlled and adjusted in a targeted manner by way of grain size distribution. Sintering temperatures of below 2,000° C., particularly below 1,800° C. and below 1,400° C., can be achieved.

By defining the grain size and grain size distribution, pore structure can also be adjusted. Thus, a defined, uniform, open-pore structure can be obtained. Subsequently, the pores can be filled, for example, with carbon or carbon precursors. During the production of fiber-reinforced silicon carbide ceramics, the homogenous pore structure can be controlled such that later a complete conversion of carbon with liquid silicon can take place. This can occur, for example, with offered carbon for filling the pores.

This eliminates the disadvantages of the prior art mentioned above. First, during production of fiber-reinforced silicon carbide ceramics, there remains no residual carbon content or residual silicon content. In addition, the structure is absolutely uniform; fibers are protected because of low sintering temperatures; and low temperatures result in cost reduction.

For grain size distribution, a selection can be made between several possibilities. Grain size may be monomodal with a broader grain distribution, but also bimodal with a fine-grain fraction and a coarse-grain fraction. A trimodal construction with a fine, a medium coarse and a coarse grain is also possible. In all cases, it is important that a fine grain fraction is present. If a high packing density is desired, a bimodal grain structure is preferably used.

The upper limit of the grain size of the fine grain fraction is approximately 2 $\mu$m. The lower limit is small enough so that it cannot be reliably measured. A preferred grain size distribution is between approximately 0.25 $\mu$m and 1 $\mu$m. Usually expenditures of temperature and time during sintering are lower with smaller grain size of fine grain fraction.

In the case of a monomodal fine grain structure, the grain size ranges are preferably at a $d_{50}$ value of less than approximately 10 $\mu$m, preferably about 1 $\mu$m.

Grain size of the coarse grain fraction is at approximately 1.5 $\mu$m to 30 $\mu$m and is independent of grain size of the fine grain fraction. Grain sizes of approximately 2 $\mu$m to 5 $\mu$m are preferred. When producing fiber-reinforced ceramics, grain size must be coordinated with fiber diameter.

Numerous possibilities exist for shaping the green body. Production by slip casting is preferred. A pressure diecasting or a film casting, extrusion processes, injection molding, isostatic pressing, axial pressing or RAM pressing and comparable processes may be used. With long fibers or fibrous tissue, known winding and depositing techniques also may be used in which the fibers or the tissue are dipped into a slurry of the raw material batch and are then wound or placed or pressed or otherwise processed.

For adjusting pore size and pore structure, in addition to grain size and grain distribution, shaping processes for producing the green body must also be included. During manufacturing of fiber-reinforced bodies, the matrix is also placed in fiber bundles and holds ducts open. The fibers are embedded completely into the porous matrix.

The green body, which may be provided with reinforcing fibers, is sintered at temperatures of up to approximately 1,800° C., preferably approximately 1,400 to 1,800° C. An open-pored porous body is obtained which has a uniform pore structure and can be infiltrated well. For producing fiber-reinforced silicon carbide ceramics, the porous body is impregnated with carbon or a carbon precursor. Carbon can be controlled by the type of precursor (by way of its carbon yield, or the degree of dilution of the carbon or of the precursor in solvent or a suspending agent). Silicating takes place under conventional conditions. In the process, shrinkage of the shaped body or of the composite does not take place in any process step.

For producing RSiC, in the case of the silicon carbide batches on which the invention is based, it is particularly advantageous that a carbon fraction be used which corresponds to silicon dioxide contained in the batches. The specific surface is always coated with a thin layer of silicon dioxide required for hardening. Heretofore, for producing recrystallized silicon carbide, carbon contamination hindered the sintering process. When a particularly fine grain is used, a particularly large specific surface is obtained, such as, approximately 35 $m^2/g$. Thus, a relatively high silicon dioxide content will be present which permits a corresponding carbon fraction without hindering hardening.

For producing the fiber-reinforced body, all known reinforcing fibers are suitable, including whiskers or platelets. These include carbon fibers, as well as oxidic and non-oxidic ceramic fibers, such as SiBNC fibers. These fibers may be short fibers as well as continuous fibers, such as long fibers or laid fibers.

For the recrystallized material, recrystallized boron carbide, recrystallized aluminum nitride and recrystallized titanium carbide are also suitable in addition to recrystallized silicon carbide.

The porous matrices may be mixed with a suitable metallic or non-metallic substance. Examples of non-metallic substances are carbon precursors or glass meltings. By the infiltration or reaction infiltration of these porous matrices, completely dense bodies can be produced or composite bodies with a completely dense matrix.

The pores may also only partially be treated, for example, with pure carbon (for example, for filters, such as gas filters).

Other objects, advantages and novel features of the present invention will become apparent from the following detailed description of the invention when considered in conjunction with the accompanying drawings.

DETAILED DESCRIPTION OF THE DRAWINGS

The production of a fiber-reinforced silicon carbide ceramic body by slip casting is described. The slip casting process is known per se and is described in the prior art mentioned above. However, the use of slip-casting is not absolutely necessary for the process of the invention.

Water is mixed with a liquefier. The liquefier may be based on ammonium hydroxide or an organic material. The pH of the solution liquefied with ammonium hydroxide is set to 11.4. The bimodal silicon carbide batch with grain distribution $d_{50}=3$ μm for the coarse grain fraction (70%) and $d_{50}=0.5$ μm for the fine grain fraction (30%) is stirred into the solution. A homogeneous aqueous slurry is provided which has a solids content of approximately 75% and is then densified to a shaped body by means of fiber tissue layers. The densified body is removed from the mold in a leather-hard condition and is dried to constant weight at 110° C. (±5° C.).

The resulting green body is sintered in a graphite furnace (resistance furnace), first in a vacuum, later under inert gas, to a final temperature of 1,700° C. The holding time is 150 minutes. Subsequently, a controlled cooling takes place to 1,500° C. Then a sudden cooling is carried out to room temperature.

The resulting composite body has a porosity of 19% and is completely open-pored. No shrinkage and therefore no change of the shape of the body took place during sintering.

The resulting porous body was vacuum-impregnated by means of a phenolic resin and hardened at 175° in an autoclave. The body was then pyrolized at a temperature of 1,000° C. under protective gas. The subsequent liquid silicating took place by wick infiltration at 1,560° C. The holding time amounted to 20 minutes.

Figure 1:
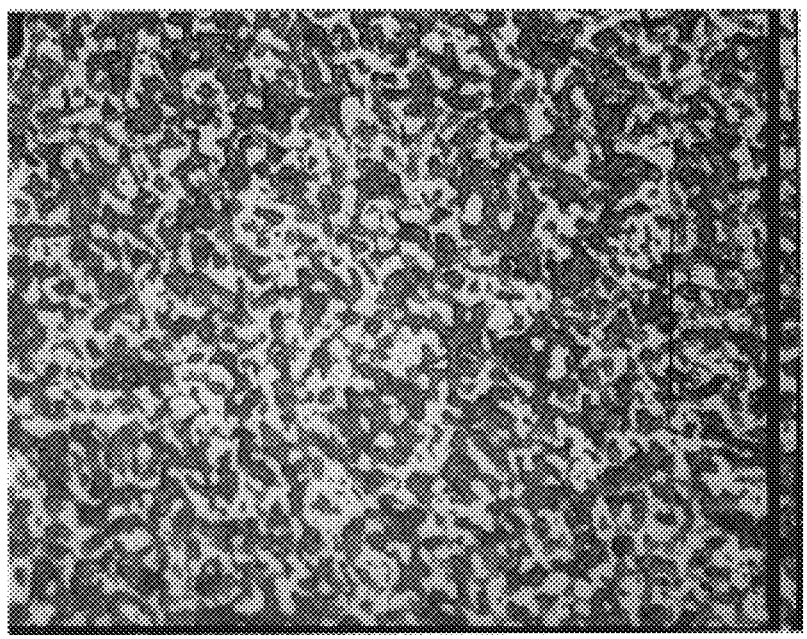
FIGS. 1 and 2 are views of ground surfaces of various matrices made of RSiC which were obtained from various silicon carbide batches under differing conditions.

FIG. 1 is a view of the ground surface of an RSiC matrix which was obtained by means of a slip casting process. A silicon carbide batch was used with a bimodal grain distribution with a coarse grain fraction of 70% and a fine grain fraction of 30%. The $d_{50}$-value of the coarse grain fraction amounted to 9.30 μm, the $d_{50}$-value of the fine grain fraction amounted to 1.00 μm. The sintering temperature was 1,720° C.; the holding time at $T_{max}$ was 300 min. The result is a matrix with a relatively coarse-pored structure. It is demonstrated that this structure is very uniform and open-pored.

Figure 2:
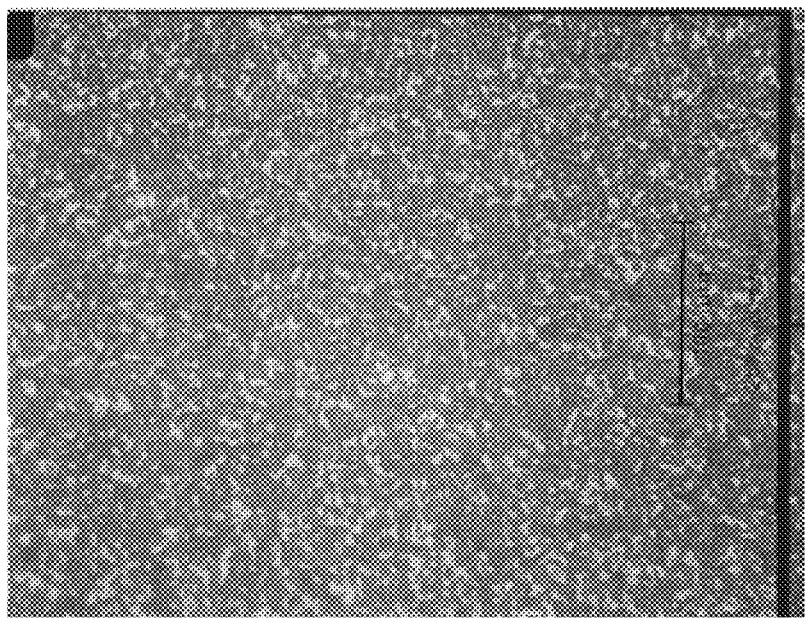

FIG. 2 also illustrates a ground surface of an RSiC matrix. In contrast to the matrix illustrated in FIG. 1, this matrix was obtained from a monomodal grain batch with a $d_{50}$ value of 1.00 μm. Other manufacturing parameters were unchanged. The resulting matrix has a fine-pored, also very uniform, open-pored structure. On the whole, the structure is finer than that of the matrix illustrated in FIG. 1.

Figure 3:
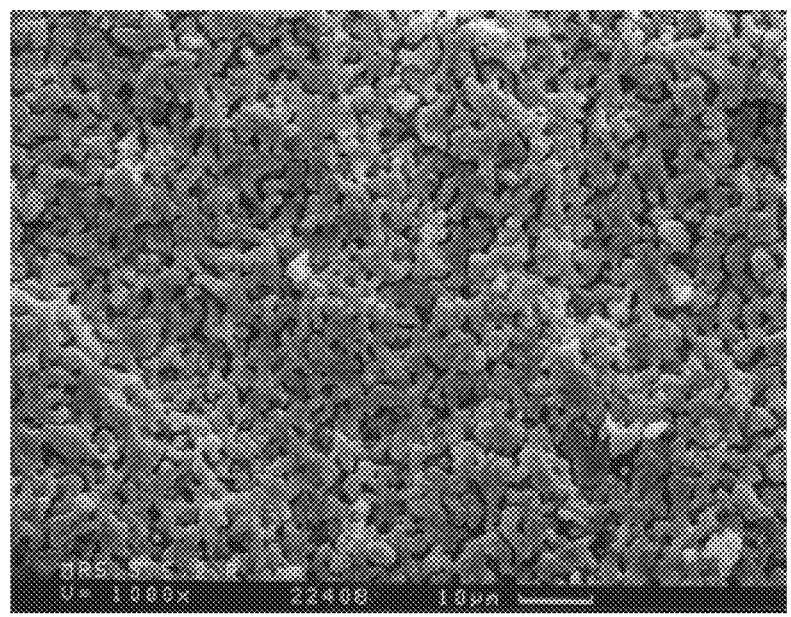
FIG. 3 is a scanning-electron-microscopic picture of the matrix illustrated in FIG. 2.

FIG. 3 is an REM picture of the matrix of FIG. 2. This is a particularly good representation of the uniform construction of the porous matrix with the finely distributed pores.

Figure 4:
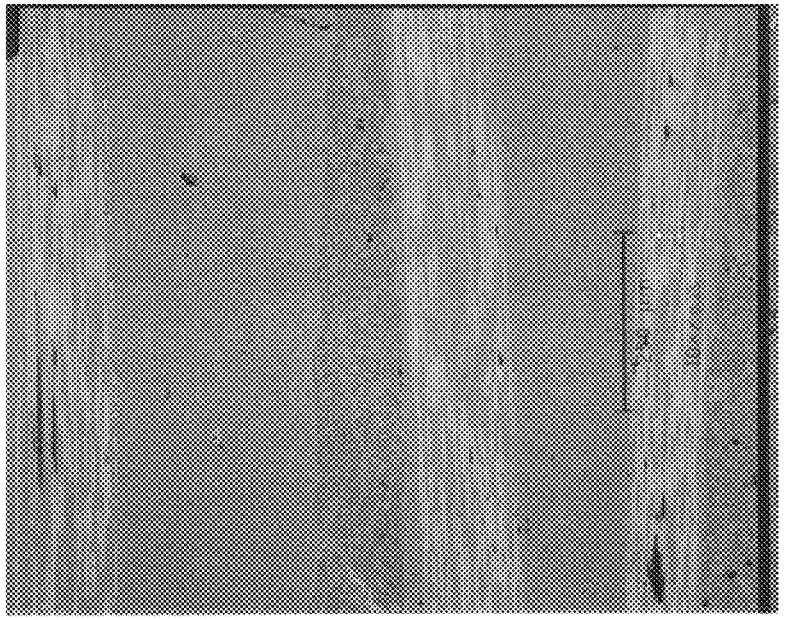
FIG. 4 is a view of a ground surface of a body made of a composite material of carbon-fiber-reinforced silicon carbide.

FIG. 4 is a view of a ground surface of a composite body made of carbon-fiber-reinforced silicon carbide (C/SiC) produced according to the above-described process. For producing the RSiC matrix, a bimodal grain batch with 70% coarse grain ($d_{50}$ value=3.00 μm) and 30% fine grain ($d_{50}$ value=0.25 μm) was used. As described above, the slurry was mixed with carbon fibers and sintered at 1,680° C. The holding time at $T_{max}$ amounted to 150 min. The resulting matrix was impregnated with a phenolic resin, was hardened at 175° C., and was pyrolized in an argon atmosphere at 1,000° C. The resulting carbon matrix was converted by means of liquid silicating at 1,560° C. in a vacuum. The composite body is uniformly converted, without open pores, carbon islands or silicon islands.

The fiber-reinforced materials are suitable for tribological applications, for example, for brake units and sliding elements, and for structural applications, for example, in automobile construction and racing sports, power units and space operations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a body having a porous matrix made of at least one recrystallized ceramic material, comprising:

producing a raw material batch containing SiC raw material powder having a fine grain fraction of an average of at most about 2μm and a course grain fraction of an average of about 1.5μm to 30μm;

mixing at least one type of a reinforcing fiber with the raw material batch to form a mixture;

shaping the mixture by a process selected from the group consisting of slip casting, pressure diecasting, film casting, extrusion, injection molding, isostatic pressing, axial pressing, RAM pressing, winding and depositing techniques to form a green body;

sintering the green body at a temperature of about 1400° C. to 1800° C., thereby forming a body having a porous matrix made of recrystallized SiC;

infiltrating the body having a porous matrix with a carbon-containing substance; and converting the carbon to silicon carbide with liquid silicon.

2. The process according to claim 1, wherein the SiC raw material powder has a monomodal grain size distribution.

3. The process according to claim 2, wherein the SiC raw material powder has a $d_{50}$ value of less than about 10 μm.

4. The process according to claim 2, wherein the SiC raw material powder has a $d_{50}$ value of about 1 μm.

5. The process according to claim 1, wherein the SiC raw material powder has a bimodal grain size distribution with a grain band gap between said fine grain fraction and said coarse grain fraction.

6. The process according to claim 5, wherein the fine grain fraction has a grain size of about 0.25 μm to 1 μm or the course grain fraction has a grain size of about 2μm to 5μm, or both.

7. The process according to claim 1, wherein the SiC raw material batch has a carbide fraction corresponding to a silicon dioxide fraction.

8. The process according to claim 1; wherein the SiC raw material powder has a trimodal grain size distribution having a medium-coarse grain fraction in addition to the fine and coarse grain fractions, and two grain band gaps.

9. The process according to claim 8, wherein the fine grain fraction has a grain size of about 0.25µm to 1µm or the course grain fraction has a grain size of about 2µm to 5µm.

10. The process according to claim 1, wherein the at least one type of reinforcing fibers is selected from the group consisting of short fibers, long fibers and laid fibers.

11. The process according to claim 10, wherein the at least one type of reinforcing fibers is selected from the group consisting of carbon fibers, ceramic fibers, oxidic fibers and non-oxidic fibers.

12. The process according to claim 1, further comprising treating the body having a porous matrix with a substance which is one of metallic and non-metallic substance, thereby converting the body having a porous matrix to a completely dense body, a body having at most residual porosities or a composite body.

13. The process according to claim 12, wherein said treating comprises one of infiltration and reaction infiltration.

14. A process for producing a fiber-reinforced body having a porous matrix, comprising:

producing a raw material batch containing SiC raw material powder having a fine grain fraction of an average of at most about 2µm and a course grain fraction of an average of about 1.5µm to 30µm;

mixing at least one type of a reinforcing fiber with the raw material batch to form a mixture;

shaping the mixture by a process selected from the group consisting of slip casting, pressure diecasting, film casting, extrusion, injection molding, isostatic pressing, axial pressing, RAM pressing, winding and depositing techniques to form a green body;

sintering the green body at a temperature of about 1400° C. to 1800° C., thereby forming a fiber-reinforced body having a porous matrix made of recrystallized SiC;

impregnating the fiber-reinforced body with a carbon-containing substance; and converting the carbon-containing substance to carbon, thereby forming a fiber-reinforced body having a carbon-containing porous matrix.

15. A process for producing a fiber-reinforced silicon carbide ceramic, comprising:

producing a raw material batch which contains SiC raw material powder having a grain size distribution with a fine grain fraction of an average grain size of at most about 2 µm and a coarse grain fraction of an average grain size of about 1.5 µm to 30 µm;

mixing reinforcing fibers with the raw material batch;

shaping the raw material batch to produce a green body;

sintering the green body at a temperature of about 1400° C. to 1800° C., thereby forming a fiber-reinforced body having a porous matrix made of a recrystallized ceramic material;

impregnating the fiber-reinforced body with a carbon-containing substance; and converting the carbon to silicon carbide with liquid silicon, thereby forming a silicon carbide ceramic.

* * * * *